June 27, 1967

W. A. CAVAGNARO 3,328,038

CARTRIDGE ARRANGEMENT

Filed April 2, 1964

2 Sheets-Sheet 1

INVENTOR:
WILLIAM A. CAVAGNARO

BY Thomas A. Briody
HIS ATTORNEY.

INVENTOR:
WILLIAM A. CAVAGNARO
BY Thomas A. Briody
HIS ATTORNEY.

3,328,038

CARTRIDGE ARRANGEMENT

William A. Cavagnaro, Decatur, Ill., assignor to General Electric Company, a corporation of New York Filed Apr. 2, 1964, Ser. No. 356,820
2 Claims. (Cl. 274—37)

This invention relates to an improved electro-mechanical transducing assembly for audio reproduction from disc type records, and more particularly to an improved device for enhancing the protection of records and of the transducing assembly itself from possible damage.

An important object of the present invention is to provide an improved device integrally associated with a stylus carrying catridge to help protect records from possible damage due to the impingement of the cartridge therewith.

Another object of my invention is to provide an improved resilient means arranged to coact with a record for enabling a stylus to pivot out of engagement with the record.

An additional object of my invention is to provide a resilient cushion which is arranged not only to coact with a record to protect the record from undesirable abrasion, also to serve as a fulcrum for pivoting a stylus out of engagement with a record.

A still further object of my invention is to provide a resilient means integral to a cartridge for facilitating the convenient manipulation of a cartridge from one portion of a record to another portion thereof.

In accordance with my invention, in one form thereof, there is provided a tone arm and cartridge assembly of the type wherein the cartridge is supported for pivotal movement relative to the tone arm. The cartridge includes a record tracking stylus for playing engagement with a record. With such an arrangement, a resilient bumper is secured to the underside of the cartridge for engagement with a record upon the exertion of an abnormal downward vertical pressure upon the tone arm. This bumper is arranged on the cartridge to provide a cushioning engagement with the record, thereby protecting the surface of the record from possible damage due to the exertion of excessive pressure upon the tone arm. The bumper is also arranged on the cartridge so that it serves as a resilient fulcrum to pivot the stylus out of engagement with the record in response to the exertion of abnormal downward vertical pressure on the tone arm. The resilient bumper thus effectively serves the twofold purpose of protecting records and the stylus from possible damage.

Further aspects of my invention shall become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawings, in which:

Figures 1, 2, 3, 5, 6, 7, 8:
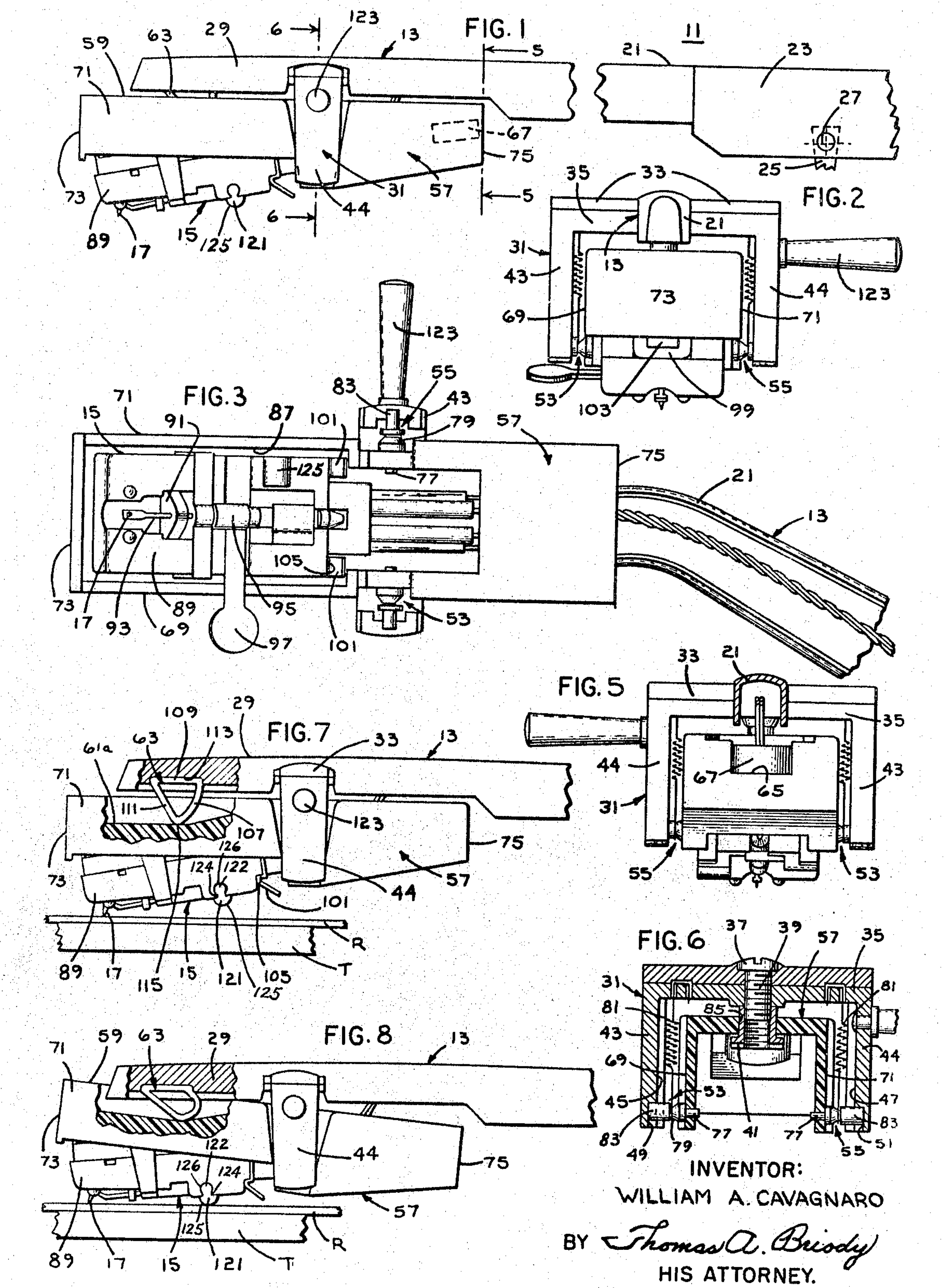
FIG. 1 is a side elevation view of an improved cartridge and tone arm assembly embodying my invention, the cartridge being shown mounted on the free end of a fragmentarily illustrated tone arm.
FIG. 2 is a front view of the assembly shown in FIG. 1.
FIG. 3 is an enlarged bottom view of the assembly shown in FIG. 1.
FIG. 5 is a cross-sectional view taken generally along the line 5—5 of FIG. 1.
FIG. 6 is a cross-sectional view taken generally along the line 6—6 of FIG. 1.
FIG. 7 is a fragmentary view similar to FIG. 1, but showing the cartridge and tone arm partly broken away to illustrate the triangular shaped damping element, and showing the record tracking stylus in playing engagement with a record.
Figure 9:
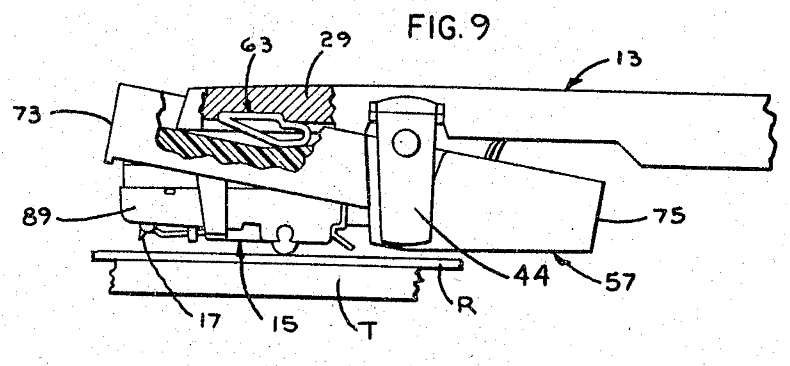

FIG. 8 is a view similar to FIG. 7, but showing the relative positions of the cartridge, tone arm, bumper and record after an abnormal downward vertical pressure is applied to the top of the free end of the tone arm; and FIG. 9 is a view similar to FIG. 7, showing the relative positions of the cartridge, tone arm, bumper and record after a substantial downward vertical pressure is applied to the top of the free end of the tone arm.

Referring first to FIGS. 1–5, there is shown a cartridge and tone arm assembly 11 embodying one form of my invention. The assembly 11 includes an elongated tone arm 13 having a cartridge 15 mounted thereon. The cartridge 15 has at least one stylus 17 adapted to track in the groove of a sound reproducing record R (FIGS. 7–9).

The tone arm 13 includes an elongated body comprising a tubular arm section 21 extending outwardly in cantilever fashion from pivotally supported portion 23. As shown in FIG. 1, rear portion 23 of the tone arm body is pivotally secured to a suitable support 25, to provide a substantially horizontal tone arm axis 27 about which the tone arm rocks incident to the placing of the tone arm on the record R and lifting the tone arm from the record. The pivoting of the tone arm 13 about the tone arm axis 27 permits a wide range of vertical movement of the tone arm and thereby enables a substantial group of stacked records to be accommodated on the record spindle of an automatic changer without impairing the effective operation of the assembly 11.

To enable the cartridge 15 to be pivotally supported on tone arm 13, there is provided near free end 29 of arm 13, a U-shaped frame 31. More particularly, as shown in FIG. 2, a pair of transverse shoulders 33 are formed integrally to tubular arm section 21 of the tone arm 13 near its free end 29. The shoulders 33 extend outwardly from opposite sides of arm section 21, and are secured in overlying relationship to base 35 of frame 31 by means of the threaded securement of screw 37 (extending downwardly from above arm section 21), as shown in FIG. 6, to the base 35. It will also be noted that the threaded shank 39 of screw 37 (FIG. 6) is long enough so that it extends downwardly for a considerable distance from the bottom of base 35 of frame 31. The reason for this is to enable screw 37 to engage nut 41, which helps to positively couple the cartridge 15 to the tone arm 13, a shall be set forth in detail hereinafter.

The frame 31 is thus rigidly secured to the underside of the tone arm 13 near its free end 29, as shown in FIG. 2, and arms 43, 44 of frame 31 depend in a vertical direction from base 35. On the bottom of the arms 43, 44 of frame 31, at inwardly facing surfaces 45 and 47 thereof (FIG. 6), there is formed a pair of bearing slots 49, 51. The slots 49, 51 receive and pivotally support a pair of trunnions 53, 55, which are rotatably journaled therein to facilitate pivotal movement of the cartridge 15 relative to the tone arm 13.

In order to protect the cartridge 15 and records associated therewith from possible damage due to sudden and severe jarring, as shown in FIGS. 1, 2 and 6, there is provided a carrier member 57 located exteriorly of and on the underside of free end 29 of the tone arm 13. The carrier member 57 may be fabricated from a readily manufacturable and durable metal such as aluminum, having sufficient mass for the application. The outer periphery of member 57 is generally box-shaped and oblong. Top 59 of member 57 has an elongated recess 61 (FIG. 4) formed therein to enable it to cooperate with a damping element 63 and the free end 29 of tone arm 13. Near the right side of the top 59 of member 57 (viewing FIG.

4), there is formed a recess 65 for receiving a counterbalancing weight 67. (See also FIG. 5).

The particular construction and arrangement of the cartridge 15 and carrier member 57 on tone arm 13, and the utilization of a damping element between carrier member 57 and tone arm 13, comprises the invention of Roy Dally, and is described and claimed in his co-pending application Ser. No. 356,814 filed concurrently herewith and assigned to the same assignee as the present invention.

Figure 4:
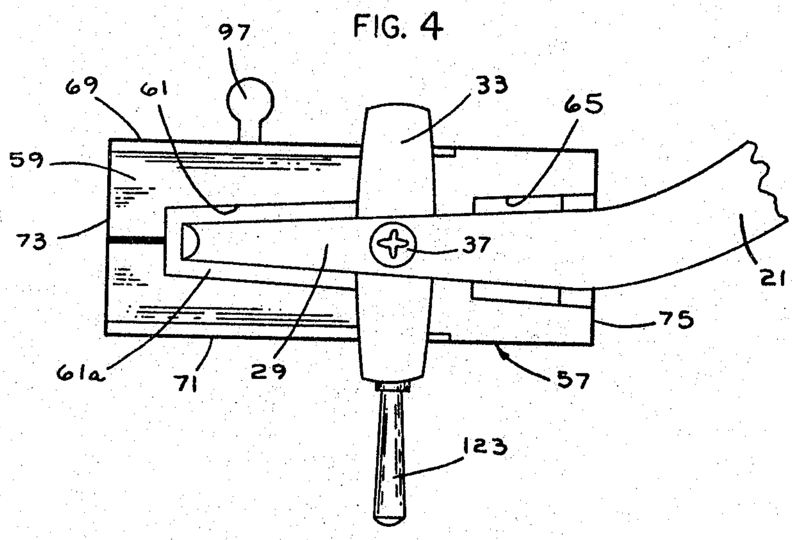
FIG. 4 is a top view of the assembly shown in FIG. 1.

The elongated side walls 69 and 71 of member 57 are arranged in mutually parallel relationship, and they are also parallel to the longitudinal axis of the free end 29 of the tone arm (FIG. 4). Between the front end 73 and rear end 75 of the carriage member 57, but closer to rear end 75 thereof, as shown in FIG. 3, the trunnions 53 and 55 are suitably secured to and project outwardly in transverse fashion from side walls 69 and 71, respectively. Thus, more particularly, as shown in FIG. 6, each of the trunnions 53, 55 includes a shank portion 77 which extends through and is secured to an associated side wall of member 57, an annular notch 79 for receiving the looped bottom end of a tension spring 81, and a rotatable cylindrical section 83 which is seated in one of the bearing slots 49, 51 of frame 31. The member 57 is spring biased upwardly in a vertical direction to engage bearing slots 49, 51 by means of the two tension spring 81, which have their upper looped ends wrapped around associated ribs of the base 35 of frame 31 (as shown in FIG. 6). With such an arrangement, the carriage member 57 is thereby rotatably journalled in the bearing slots 49, 51 of arms 43, 44 of the tone arm.

To help prevent undesirable downward and lateral movement of carriage member 57 from its pivotal support, the bottom threaded section of screw 39 cooperates with headed nut 41, as shown in FIG. 6. Nut 41 extends loosely through an elongated slot 85 formed in the top of the carriage member and has its head located underneath the bottom surface of the top wall of the carriage member 57 wherein slot 85 is located.

Turning now to a more detailed description of the arrangement of cartridge 15 in the carriage member 57, attention is directed initially to FIGS. 1–3. As shown therein, the cartridge 15 is mounted within a recessed cavity 87 (FIG. 3) on the underside of carriage member 57 so that its longitudinal axis is inclined downwardly from rear to front at an acute angle relative to the longitudinal axes described respectively by the free end portion 29 of the tone arm (FIG. 1) and the carriage member 57 (viewing FIG. 1). Thus, as shown in FIG. 1, the cartridge 15 is directed downwardly and to the left from the rear to front, and depends from the underside of carriage member 57. It will be further noted that the carriage member 57 is longer on the left side of its pivotal axis (viewing FIG. 1) than on the right side thereof, and that the cartridge 15 is also located on the left side of the axis of rotation of the carriage member.

The cartridge 15 shown is of the ceramic stereo type, and it comprises a housing 89 which may be composed of upper and lower parts attached together by rivets (not shown). The interior of the housing 89 is partly hollow, and contains a pair of elongated ceramic transducer elements (not shown) and a resilient element 91 for coupling these elements to an elongated drive rod 93. The drive rod 93 has the stylus 17 secured to the underside of its free end (as shown in FIGS. 1 and 7), and it is secured to a barrel member 95 (FIG. 3) which is removably located in cartridge 15. The drive rod 93 and barrel member 95 form a stylus assembly for the cartridge unit, the positioning of which may be adjusted by the rotatable manipulation of an arm 97 which is secured to the barrel member 95.

The cartridge 15 is removably seated in secure engagement with carriage member 57 by means of the cooperation of front and rear clip sections 99 (FIG. 2) and 101 (FIG. 3) respectively, with projection 103 and shoulders

105 of the cartridge housing. Thus, as shown in FIG. 2, projection 103 on the front end of the cartridge housing, extends through a mating aperture of clip section 99, and the rear clip sections 101 engage underneath associated shoulders 105. The cartridge 15 may thus be readily and removably inserted into cooperative securement with carriage member 57.

For resiliently cushioning the movement of the carrier member 57 relative to the tone arm 13, as shown in FIGS. 7–9 there is provided the resilient damping element 63. The element 63 is made from a rubber-like material; i.e., a material that is highly resilient, readily deformable and has a rapid and complete restoring force so that it will quickly return to its original shape upon being deformed and then released. Butyl, having a Shore A durometer hardness range of from 35 to 55, is a suitable rubber-like material, as is rubber itself.

As shown in FIG. 7, the element 63 is formed in the general configuration of a triangle which has one outwardly concave side 107 joined to a pair of intersecting equilateral sides 109 and 111. The upper side 109 (FIG. 7) of the element 63 is suitably secured to a surface 113 formed in the recessed underside of tone arm 13, near the extreme free end thereof. The lower corner 115 of the resilient element 63 engages the bottom horizontal surface **61*a* of the recess 61 of carriage member 57 and compressibly cooperates therewith to cushion the relative movement of cartridge 15 relative to tone arm 13**, in the manner illustrated by a comparison of FIGS. 7–9.

For normal playing operation, as shown in FIG. 7, the stylus 17 of cartridge 15 is in normal playing engagement with the grooves of record R upon turntable T. The longitudinal axis of carriage member 57 and the longitudinal axis of the free end 29 of the tone arm are then generally parallel to the surface of the record R. With the cartridge 15 and tone arm 13 in this position, the corner 115 of element 63 engages and exerts a relatively small compressive force upon surface **61*a* of the carrier member 57**. This force is exerted in a vertical direction (viewing FIGS. 7–9) and it provides a shock absorbing effect for protecting the cartridge and its components as well as records being played, during the normal operation of the phonograph and tone arm cartridge assembly.

At certain frequencies, depending upon the resonant frequency of the cartridge and its mounting, the assembly will usually resonate. By using a resilient damping means such as element 63 between the cartridge and tone arm, the resultant vibrations incident to the resonant frequency of the cartridge and mounting are effectively quelled.

It will thus be seen that the triangular shaped elastomeric element 63 provides a flexible mechanical connection between the pivoted cartridge supporting carrier 57 and the free end 29 of the tone arm 13, which provides stability of operation and performance of the tone arm and cartridge assembly, and in particular it also provides a shock absorbing protection for the cartridge and components against vertically directed forces.

As further examples of the mode of operation of resilient element 63, attention is also directed to FIGS. 8 and 9. For FIG. 8, an abnormal downward vertical force is imparted to the top of the free end of the tone arm. The longitudinal axis of member 57 is thereupon directed upwardly and angularly from the surface of record R (from rear 75 to front 73 of member 57). The free end tip of tone arm end 29 enters recess 61 of member 57. The element 63 thereupon compresses to a greater degree, as shown in FIG. 8, to resiliently cushion the relative movement of the cartridge carrying member with respect to the free end of the tone arm.

As shown in FIG. 9, when a substantial downward vertical thrust is imparted to the top of the free end 29 of the tone arm 13, the resilient element 63 is compressed substantially to effectively cushion the relative movement of the cartridge carrier 57 with respect to tone arm 13.

Turning now to an important aspect of the present invention, which concerns itself with a novel and effective means for protecting records from undesirable abrasion by the cartridge and also for protecting the cartridge itself from possible damage, attention is now again directed to FIGS. 7–9. As shown therein, on the bottom side of the cartridge housing 89, near shoulders 105 thereof, there is arranged a resilient bumper 121. The resilient bumper 121 is preferably constructed, like element 63 of previous description, from a rubber-like material that is highly resilient, readily deformable, and has a rapid and complete restoring force. One suitable material for such a purpose is butyl rubber, having a Shore "A" durometer hardness range of from 40–70. In particular, it has been found that butyl rubber having a Shore "A" durometer hardness of approximately 55 effectively fulfills the requirements of the present invention.

The resilient bumper 121 includes a substantially cylindrical supporting section 122 connected at neck 124 to a semi-cylindrical bottom 125. The supporting section 122 and neck 124 of the bumper 121 are fitted snugly into a mating slot 126 formed transversely in the cartridge housing 89 (as shown in FIGS. 7 and 8). The slot 126 is positioned on the bottom side of the cartridge housing, near the front wall thereof (viewing FIGS. 1 and 7), and extends transversely inwardly therefrom, toward barrel 95. With supporting section 122 of bumper 121 ensconced in mating slot 126 of the cartridge housing, the semi-cylindrical bottom 125 of bumper 121 faces downwardly from the bottom side of the cartridge housing for resilient engagement with a record in the manner illustrated in FIGS. 8 and 9.

The axis of curvature for semi-cylindrical portion 125 of resilient bumper 121, is parallel to the axis of rotation of carriage member 57 and perpendicular to the vertical plane of disposition of damping element 63. In addition, as shown in FIGS. 7 and 8, the axis of curvature of portion 125 of bumper 121 is also parallel to the top surface of record R.

In view of the curvature of portion 125 of bumper 121 and the depending arrangement of bumper 121 on the bottom wall of cartridge 15, the bottom surface of bumper portion 125 rockably coacts with the surface of a record to pivot stylus 17 out of engagement therewith when a downward vertical force of substantial magnitude is imparted to the free end of the tone arm. More particularly, the semi-cylindrical portion 125 of bumper 121 acts like a rocker rolling about its axis upon a record surface to facilitate the rotation of stylus 17 in a clockwise direction of rotation (viewing FIG. 8) about the axis of portion 125, until the stylus has disengaged itself from the record (FIG. 9).

It should also be understood that the semi-cylindrical surface 125 of bumper 121 effectively serves as a cushion to help protect the record against otherwise possible abrasion due to engagement of the cartridge housing with the record. Thus, it will now be seen that in accordance with an important aspect of the present invention, bumper 121 is specially constructed and arranged to perform two distinct and worthwhile functions. When a substantial downward vertical force is exerted on the upper surface of the free end 29 of the tone arm 13, bumper 121 effectively serves as a resilient rocking fulcrum to enable the cartridge supporting carriage 57 to pivot about the horizontal axis of semi-cylindrical portion 125 for disengagement of the stylus 17 from a record. In addition, bumper 121 also resiliently engages the record surface to prevent undesirable abrasion to the record.

An inherent advantage of the bumper 121 of the present invention also resides in its ready availability for manipulation of the stylus 17 from one groove position on a record to another groove position on the same record. For example, in disc type records including a variety of different selections, the operator of a phonograph including the tone arm and cartridge assembly 11 embodying my invention may readily shift stylus 17 from one selection to another. This may be done by first pressing down on the top of the free end of the tone arm 15 to pivot stylus 17 out of engagement with the record being played. The tone arm 15 may then be shifted horizontally about its vertical axis of rotation with the bumper portion 125 sliding along the record surface until the stylus 17 is above the desired record groove portion. Release of the downward vertical pressure on the free end of the tone arm 15 will then allow the stylus 17 to be conveniently engaged with the desired record groove portion. By simply pressing down on the tone arm to elevate the stylus, sliding the cartridge to the desired record position, and then releasing the pressure on the tone arm to allow the stylus to engage the record, an efficient and novel means is provided for readily relocating the stylus on a record without in any way damaging the stylus or record grooves.

Referring now in further detail to the drawings for a specific explanation of the operation of bumper 121 with a record, as shown in FIG. 8, a sufficient downwardly directed force has been exerted on the free end of the tone arm 13 to cause the bumper 121 to protectively engage the surface of record R, but this force is not sufficient for pivoting the carriage member 57 about bumper 121 to thereby cause the stylus 17 to disengage the record. However, as shown in FIG. 9, a substantial vertical force has been exerted upon the free end of the tone arm and as a result of the magnitude of this force, the carriage member 57 has rocked in a clockwise direction of rotation (viewing FIG. 8) about fulcrum bumper 121 until the stylus 17 disengages the record R.

As further shown in FIGS. 3 and 5, to enable the tone arm 13 to be readily removed from a record in manual fashion, or otherwise manipulated, an elongated handle 123 is arranged on upright section 44 of the frame 31 of the tone arm 13. Handle 123 may be readily grasped by the operator of the phonograph in order to locate the tone arm at the desired position on a record or at its rest position.

It will now therefore be seen that my new and improved tone arm and cartridge arrangement provides a simple and efficient means for protecting records and the stylus from possible damage. It will be further understood that the present invention provides a novel and effective means for readily manipulating a cartridge from one groove position to another groove position on the same record.

While in accordance with the patent statutes, I have deescribed what at present is considered to be the preferred embodiment of my invention, it will be obvious to those skilled in the art that various changes and modifications may be made therein without departing from the invention and I, therefore, aim in the following claims to cover all such equivalent variations as fall within the true spirit and scope of the invention.

What I claim as new and desire to secure by Letters Patent of the United States is:

1. In a tone arm and cartridge assembly of the type wherein the cartridge is supported for pivotal movement relative to the tone arm, a cartridge assembly comprising a housing therefor, said housing being mounted on said tone arm for pivotal movement about a substantially horizontal tone arm axis, a record tracking stylus means carried by said housing, a transversely extensive generally cylindrical slot formed in the bottom of said housing at one side thereof, said slot opening both downwardly and laterally into said one side of said housing, and a resilient bumper of elastomeric material secured to said cartridge housing, said bumper including an operating portion having a cylindrically curved surface which depends from the bottom of said cartridge housing, said operating portion having a semi-cylindrical configuration and an axis thereof parallel to the principal surface of the record, and a supporting portion having an upwardly facing cylindrical configuration, said cylindrically configured supporting portion cooperatively engaging said cylindrical slot thereby to readily mount said bumper upon the bottom of said cartridge housing, said operating portion of said bumper being disposed on the bottom of said cartridge housing and spaced longitudinally from said stylus means for engagement with a record engaged by said stylus means upon the exertion of an abnormal downward pressure upon said tone arm, said operating portion being arranged to rockably coact with said record thereby to pivot said stylus means out of engagement with said record in response to the exertion of abnormal downward pressure upon said tone arm.

2. The assembly of claim 1 wherein said assembly includes a readily graspable handle extending laterally from said tone arm adjacent said cartridge thereby to manipulate said cartridge assembly up and down in a generally vertical direction.

References Cited

UNITED STATES PATENTS

| | | | |
|---|---|---|---|
| 2,582,948 | 1/1952 | Cairves | 274—1 |
| 3,224,783 | 12/1965 | Wiggins et al. | 274—24 |

NORTON ANSHER, *Primary Examiner.*

CLIFFORD B. PRICE, *Examiner.*

J. F. PETERS, *Assistant Examiner.*